US006896073B2

(12) United States Patent
Fuchs

(10) Patent No.: US 6,896,073 B2
(45) Date of Patent: May 24, 2005

(54) HAND POWER TOOL WITH A PISTOL-SHAPED HANDLE

(75) Inventor: Rudolf Fuchs, Neuhausen (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 10/689,351

(22) Filed: Oct. 20, 2003

(65) Prior Publication Data

US 2004/0084194 A1 May 6, 2004

(30) Foreign Application Priority Data

Nov. 6, 2002 (DE) ........................................ 102 51 557

(51) Int. Cl.[7] ................................................ B23B 45/16
(52) U.S. Cl. ........................ 173/217; 173/170; 173/171
(58) Field of Search ................................ 173/170, 169, 173/171, 162.1, 162.2, 217

(56) References Cited

U.S. PATENT DOCUMENTS 2,513,271 A * 7/1950 Bluemink .................. 173/170
3,537,336 A * 11/1970 Schmuck .................. 408/72 R
3,934,657 A * 1/1976 Danielson .................. 173/169
4,236,589 A * 12/1980 Griffith ...................... 173/169
4,643,263 A * 2/1987 Karden ...................... 173/168
5,161,293 A * 11/1992 Ebbert ........................ 29/242
6,155,354 A * 12/2000 Pusateri et al. ............ 173/170
6,172,334 B1 * 1/2001 Harris et al. ................ 219/147
6,432,978 B1 * 8/2002 Tani et al. .................. 514/312
6,527,060 B1 * 3/2003 Schoeps .................... 173/93.5
6,796,389 B2 * 9/2004 Pusateri et al. ............ 173/170

FOREIGN PATENT DOCUMENTS

DE 198 14 175 C1 11/1999

* cited by examiner

*Primary Examiner*—Scott A. Smith
(74) *Attorney, Agent, or Firm*—Michael J. Striker

(57) ABSTRACT

A hand power tool has a housing, and a pistol-shaped handle which is supported on the housing displaceably substantially in a direction of a longitudinal axis of the hand power tool.

2 Claims, 2 Drawing Sheets

HAND POWER TOOL WITH A PISTOL-SHAPED HANDLE

BACKGROUND OF THE INVENTION

The present invention relates generally to a hand power tool with a pistol-shaped handle.

Boring machines or screwing machines in particular have a pistol-shaped handle, which is fixedly formed on the housing of the hand power tool. As a rule, this pistol-shaped handle is located at the remote end of the hand power tool. In other words, the handle in this case is located far outside of the center of gravity of the hand power tool. This great distance of the handle from the center of gravity of the hand power tool under certain conditions makes the handling of the machine difficult during the working process.

As specifically stated in the German patent document DE 198 14 175 C1 which discloses a handle for a hand power tool, various gripping positions are advantageous for the operator of a hand power tool for different working processes. In order to allow such different gripping positions for the operator, German patent document DE 198,14 175 C1 proposes a handle which has several differently oriented gripping portions. Such a handle for a hand power tool has the disadvantage that it represents an obstruction.

SUMMARY OF THE INVENTION

Accordingly, it is an object of the present invention to provide a hand power tool with a pistol-shaped handle, in which the handle can assume different gripping positions for the operator of the hand power tool, and the handle does not have obstructing or blocking construction.

In keeping with these objects and with others which will become apparent hereinafter, one feature of the present invention resides, briefly stated, in a hand power tool, comprising a housing; and a pistol-shaped handle which is supported displaceably on said housing substantially in a direction of a longitudinal axis of the hand power tool.

When the handle is displaceably supported on the housing of the hand power tool substantially in direction of the longitudinal axis of the hand power tool, it has a conventional pistol-shaped construction, and at the same time does not have blocking or obstructing gripping portions so that various gripping positions can be adjusted in a simple and convenient manner.

In accordance with another feature of the present invention, a guide is provided in the housing and extends parallel to the longitudinal axis of the hand power tool, for displaceably supporting the handle. Also, mounting means are provided for fixing the handle in its selected position on the housing. It is advantageous when the guide and the handle supported on it are groove-shaped and tongue-shaped correspondingly.

In accordance with a further feature of the present invention, contact elements can be located on the handle and on the housing in the regions which contact one another. A current flow between electric components in the handle and in the housing of the hand power tool is provided through the contact elements. The contact elements preferably are composed of several contact rails arranged in the guide of the housing and several contact points arranged on the handle and contacting the contact rails.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
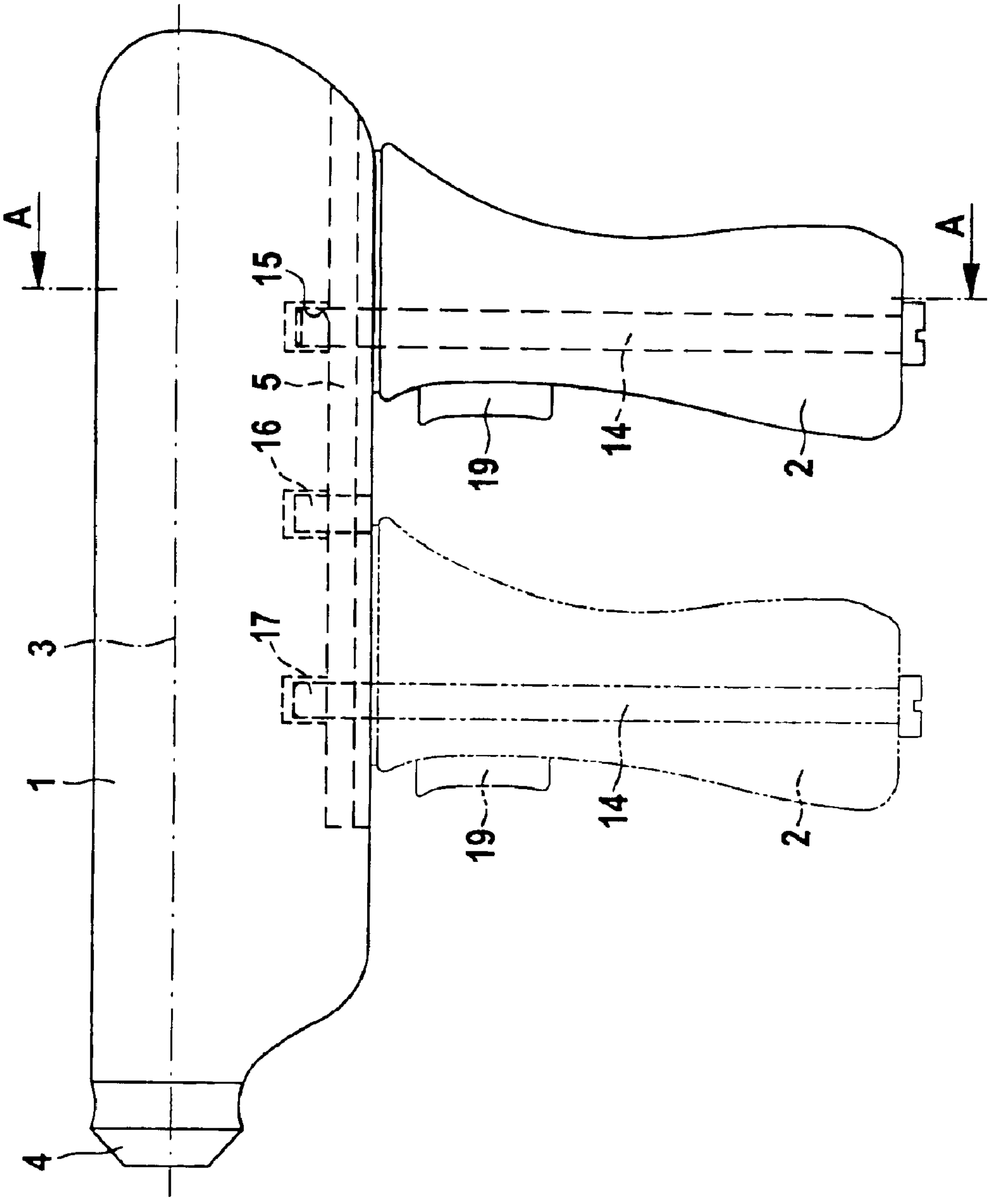
FIG. 1 is a side view of a hand power tool with a displaceable handle, in accordance with the present invention.

FIG. 1 is a side view of a hand power tool, for example a drilling machine of a screwing machine in accordance with the present invention. A pistol-shaped handle 2 is connected with a housing 1 of the hand power tool. The handle 2 is supported on the housing 1 of the hand power tool displaceably in direction of its longitudinal axis 3. The longitudinal axis 3 of the hand power tool is the axis of a tool spindle which is connected with a tool holder 4.

The handle 2 which is shown in FIG. 1 in solid lines has a position which is conventional for the pistol-shaped hand power tools. It is located at the end of the housing 1 of the hand power tool, which is the farthest from the tool holder 4. In this position the handle 2 has a great distance from the center of gravity of the hand power tool. A great distance of the handle 2 from the center of gravity of the hand power tool can easily lead during the operation 2 to tilting of the hand power tool. This can be avoided when the handle 2 is displaced more in direction toward the center of gravity of the hand power tool, as identified with a broken line for the handle 2 in FIG. 1.

Figure 2:
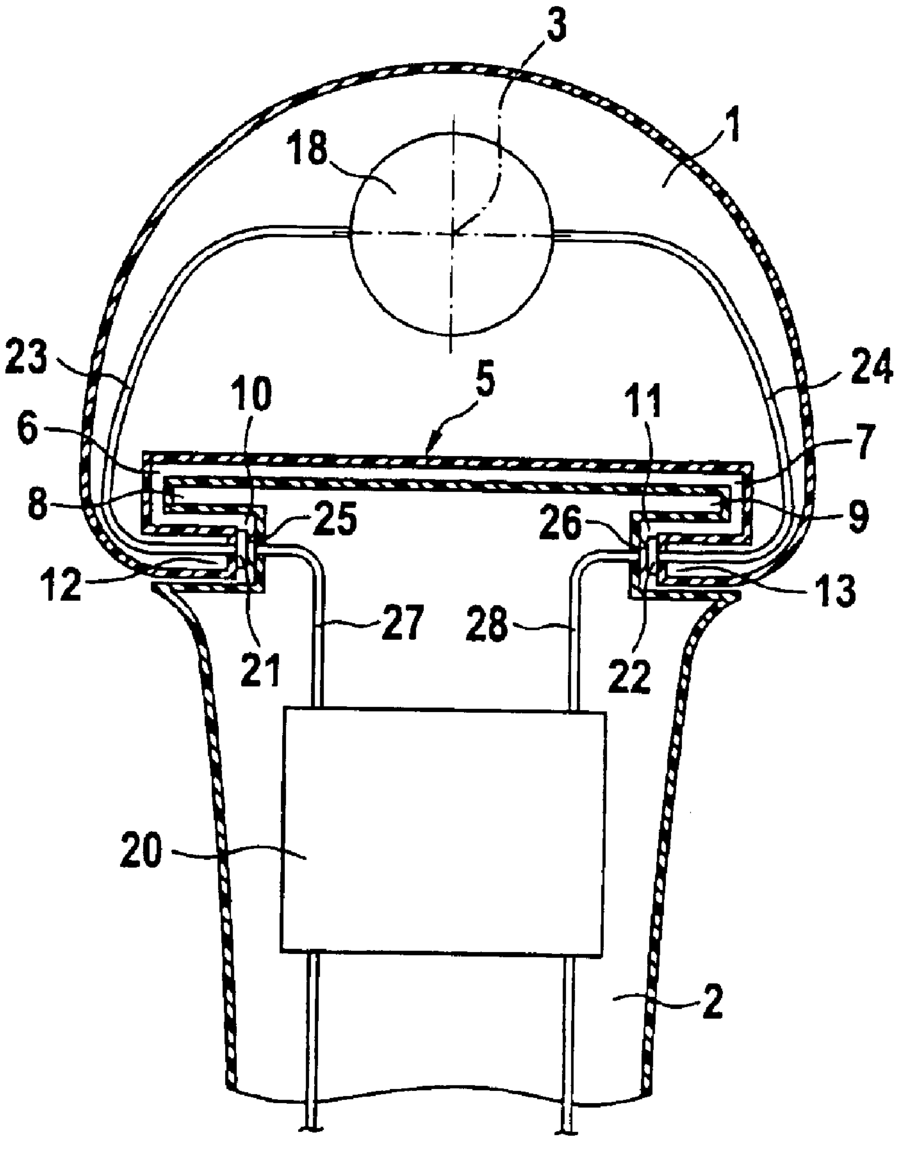
FIG. 2 is a view showing a cross-section A—A through the hand power tool and the handle in accordance with the present invention.

The cross-section through the housing 1 and the handle 2 shown in FIG. 2 illustrates how the handle 2 is supported displaceably on the housing 1 of the hand power tool in direction of the longitudinal axis 3. A guide 5 which extends parallel to the longitudinal axis 3 is provided in the housing 1, and the handle 2 is displaceably inserted in the guide 5. The guide 5 in the housing 1 and the handle 2 inserted in it have a groove shape and a tongue shape correspondingly. The symmetrical groove and tongue shapes are located at both sides of the longitudinal axis 3 of the housing 1 and the handle 2. This symmetrically formed groove-and tongue-shaped means for longitudinal guidance of the handle 2 of the housing 1 include a groove 6, 7, in which a tongue 8, 9, of the handle 2 is inserted correspondingly, and also a nut 10, 11 in the handle 2, in which a tongue 12, 13 of the housing 1 is inserted.

The double-symmetrical groove-spaced and tongue-shaped guide for the handle 2 is only one example for the longitudinal guide of the handle 2 on the housing 1. In principle any structural solution for a longitudinal groove for the handle 2 on the housing 1 is possible. In deviation from this embodiment, the guide for the handle 2 can extend inclinedly or curvilinearly to the longitudinal axis 3 of the hand power tool. The handle 2 must be however displaceable substantially in direction of the longitudinal axis 3.

In accordance with the present invention, mounting means are provided for fixing the handle 2 in the selected position along the guide 5. In FIG. 1 a very simple mounting means is provided, which is formed as a threaded rod 14. It extends from the lower end of the handle 2 through it and can be screwed in one or several threaded openings 15, 16, 17 provided in the housing 1. For turning of the threaded rod 14, a screw head which is formed on the threaded rod is provided at the lower end of the handle 2.

In the embodiment shown in FIG. 1, the adjustment positions for the handle 2 are set with the above described mounting means by the number and the location of the threaded openings 15, 16 and 17. Instead of the above described mounting means, also other screwing or clamping mounting means can be provided, for fixing the handle 2 in arbitrary position on the housing 1.

A motor 18 is accommodated in the housing of the hand power tool. A switch 19 for turning on and off of the motor 18 is located in the handle. Also, as can be seen from FIG. 2, a control electronic unit connected with the switch 19 is provided in the handle 2, for controlling the rotary speed or the torque of the motor 18. Electric components 18, 20 can be accommodated both in the housing 1 and also in the handle 2, with a current connection between them. For this purpose, contact rails 21 and 22 which extend parallel to the longitudinal axis 3 are located on both symmetrical tongues 12 and 13 of the housing 1. The motor 18 is connected with the contact rails 21 and 22 through electrical conductors 23 and 24.

Contact points 25 and 26 are arranged in the grooves 10 and 11 of the handle 2 which receive the tongues 12 and 13. The contact rails 21, 22 abut against the contact points 25 and 26 and slide along them during the displacement of the handle 2. Conductors 27 and 28 contact with the contact points 25 and 26 and lead to the control electronic unit 20 or the switch 19.

It will be understood that each of the elements described above, or two or more together, may also find a useful application in other types of constructions differing from the types described above.

While the invention has been illustrated and described as embodied in hand power tool with a pistol-shaped handle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A hand power tool, comprising a housing; and a pistol-shaped handle which is supported on said housing displaceably substantially in a direction of a longitudinal axis of the hand power tool, further comprising a guide provided in said housing and extending substantially parallel to said longitudinal axis and displaceably supporting said handle and mounting means for fixing said handle in selected positions on said housing, wherein said guide and said handle are substantially groove-shaped and tongue-shaped, and further comprising contact elements provided on said handle and on said housing and located in regions which contact one another for directing current flow through electrical components in said handle and said housing.

2. A hand power tool as defined in claim 1, wherein said contact elements include a plurality of contact rails arranged in said guide of said housing and a plurality of contact points arranged on said handle and contacting said contact rails.

* * * * *